(12) United States Patent
van Til et al.

(10) Patent No.: US 12,038,128 B2
(45) Date of Patent: Jul. 16, 2024

(54) TELEVISION SUPPORT TILT MECHANISM

(71) Applicant: Universal Electronics Inc., Scottsdale, AZ (US)

(72) Inventors: Peter Martin van Til, Enschede (NL); Niek Fox, Hengelo (NL); Luigi D'Andrea, Hengelo (NL)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 18/231,316

(22) Filed: Aug. 8, 2023

(65) Prior Publication Data

US 2023/0375130 A1  Nov. 23, 2023

Related U.S. Application Data

(63) Continuation of application No. 18/099,731, filed on Jan. 20, 2023, now Pat. No. 11,774,039, which is a continuation of application No. 17/838,431, filed on Jun. 13, 2022, now Pat. No. 11,592,142, which is a continuation of application No. 16/984,404, filed on Aug. 4, 2020, now Pat. No. 11,371,650, which is a continuation of application No. 29/740,169, filed on Jul. 1, 2020, now Pat. No. Des. 977,466, and a continuation of application No. 29/740,167, filed on Jul. 1, 2020, now Pat. No. Des. 961,560.

(51) Int. Cl.
*F16M 13/02* (2006.01)
*A47B 97/00* (2006.01)

(52) U.S. Cl.
CPC ......... *F16M 13/022* (2013.01); *A47B 97/001* (2013.01); *F16M 2200/021* (2013.01)

(58) Field of Classification Search
CPC ...... F16M 13/022; F16M 13/00; F16M 13/02; F16M 2200/021; F16M 2200/00; A47B 97/00; A47B 97/001; A47B 97/01
See application file for complete search history.

(56) References Cited

U.S. PATENT DOCUMENTS

| | | |
|---|---|---|
| 3,029,548 A | 4/1962 | Braha |
| D281,865 S | 12/1985 | Abel |
| D389,033 S | 1/1998 | Nordstrom |
| (Continued) | | |

OTHER PUBLICATIONS

U.S. Patent Office, Final Office Action issued in U.S. Appl. No. 16/984,404, dated Nov. 15, 2021, 7 pgs.

*Primary Examiner* — Monica E Millner
(74) *Attorney, Agent, or Firm* — Greenberg Traurig, LLP

(57) ABSTRACT

An apparatus includes a head portion, an undercarriage portion, and a telescopic portion configured to adjustably move into a plurality of different lengths. A first end of the head portion is rotatably attached to a first end of the undercarriage portion and a second end of the undercarriage portion is rotatably attached to a first end of the telescopic portion. A second end of the head portion is rotatably attached to a second end of the telescopic portion. In a first position, the telescopic portion has a first length of the plurality of different lengths and the head portion and the undercarriage portion form a first angle. In a second position, the telescopic portion has a second length of the plurality of different lengths and the head portion and the undercarriage portion form a second angle different from the first angle.

13 Claims, 21 Drawing Sheets

(56) References Cited

U.S. PATENT DOCUMENTS

| | | | |
|---|---|---|---|
| 5,831,696 A * | 11/1998 | Sheng | F16M 11/10 361/679.01 |
| 5,934,636 A | 8/1999 | Cyrell | |
| 6,158,978 A | 12/2000 | Norbury, Jr. | |
| 6,402,109 B1 | 6/2002 | Dittmer | |
| 6,554,242 B2 | 4/2003 | Kim | |
| 6,766,994 B2 | 7/2004 | Serbinski et al. | |
| D494,596 S | 8/2004 | Pfister | |
| 6,796,540 B1 | 9/2004 | Manceor | |
| D504,767 S | 5/2005 | DiMarchi et al. | |
| 7,178,775 B2 | 2/2007 | Pfister et al. | |
| D561,775 S | 2/2008 | Wohlford | |
| 7,331,550 B2 | 2/2008 | Gillespie et al. | |
| D574,698 S | 8/2008 | Grey | |
| 7,487,940 B2 | 2/2009 | Saez et al. | |
| D595,702 S | 7/2009 | Bremmon et al. | |
| 7,866,622 B2 | 1/2011 | Dittmer | |
| 7,950,613 B2 | 5/2011 | Anderson et al. | |
| D650,373 S | 12/2011 | Stemple | |
| 8,094,438 B2 | 1/2012 | Dittmer et al. | |
| 8,109,485 B2 | 2/2012 | VanLanen et al. | |
| D667,391 S | 9/2012 | Dolack | |
| D674,783 S | 1/2013 | Dolack | |
| D675,281 S | 1/2013 | Speroni | |
| D700,674 S | 3/2014 | Prieto | |
| D744,473 S | 12/2015 | Tsai et al. | |
| 9,408,465 B2 | 8/2016 | Dowling et al. | |
| 9,625,091 B1 | 4/2017 | Massey | |
| D802,042 S | 11/2017 | Peabody et al. | |
| 10,738,941 B2 | 8/2020 | Newville et al. | |
| 2002/0104941 A1 | 8/2002 | Pfister | |
| 2003/0189155 A1 * | 10/2003 | Serbinski | G06F 1/1601 248/371 |
| 2005/0236542 A1 | 10/2005 | O'Neill | |
| 2008/0237411 A1 | 10/2008 | Kim | |
| 2008/0283694 A1 | 11/2008 | VanLanen et al. | |
| 2011/0290950 A1 * | 12/2011 | Gotovac | F16M 11/2014 248/65 |
| 2019/0346081 A1 | 11/2019 | Cooper | |

* cited by examiner

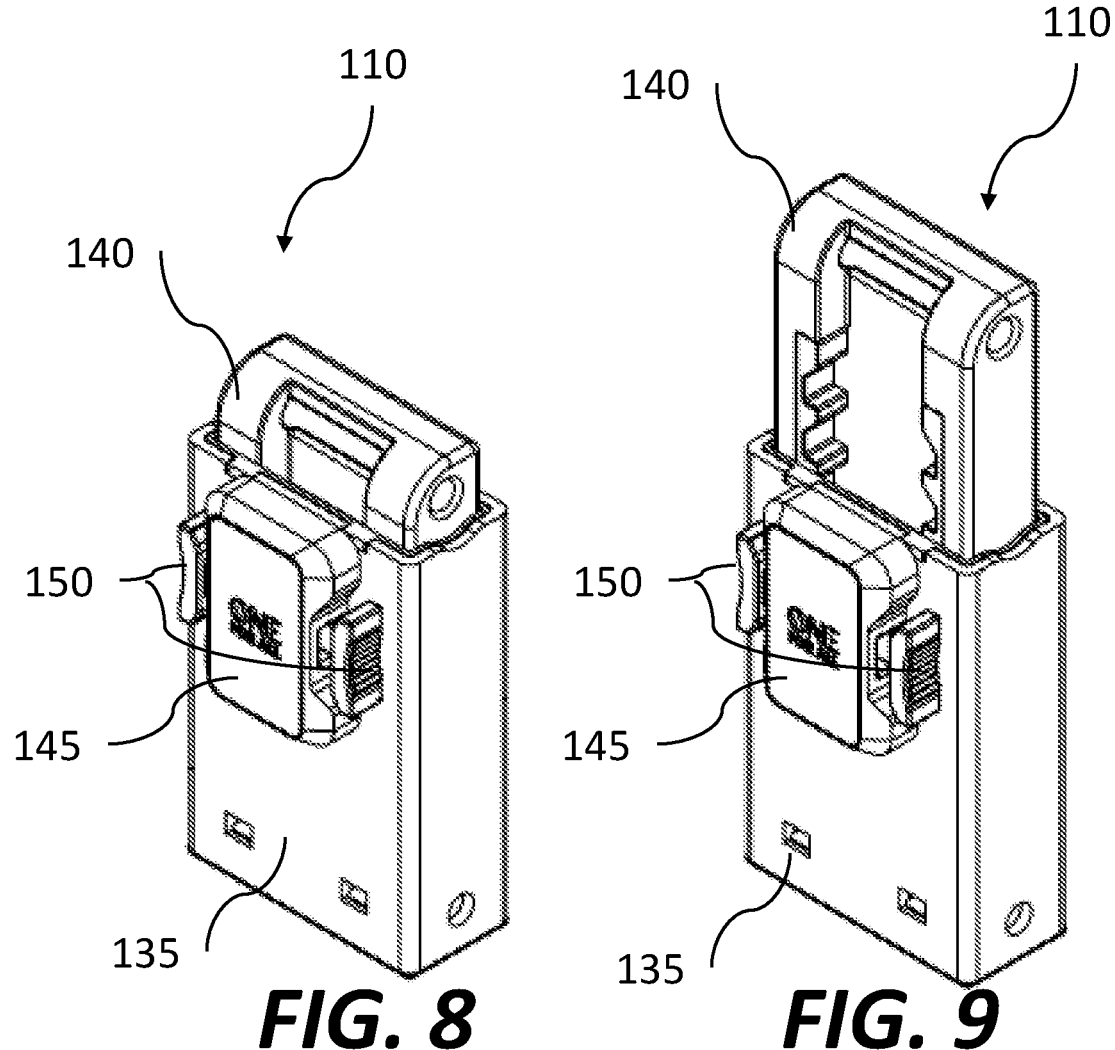

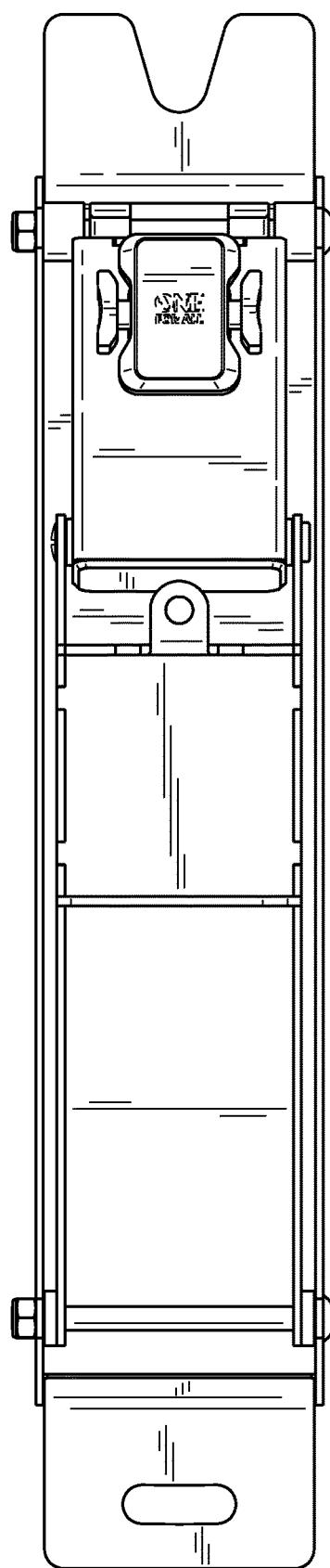 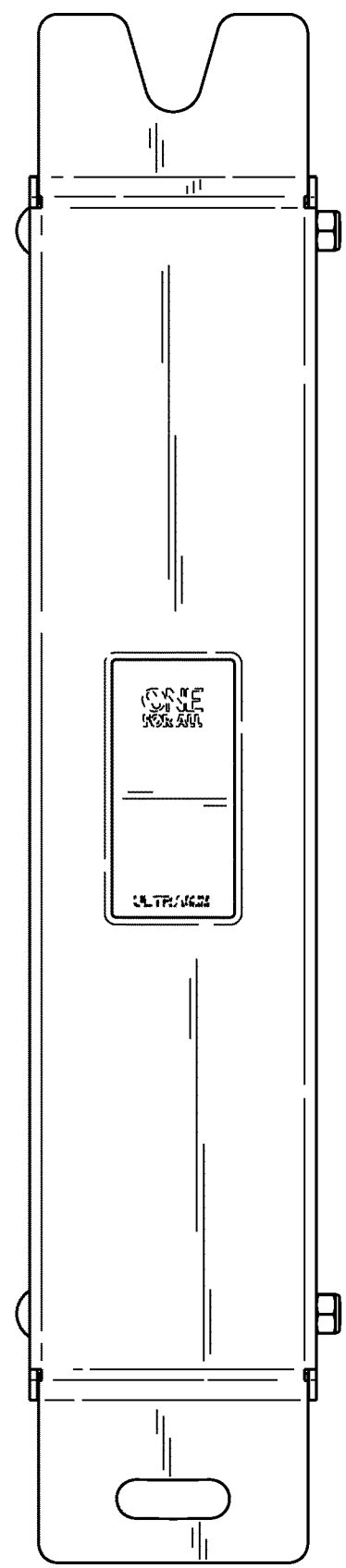
*FIG. 18*  *FIG. 19*

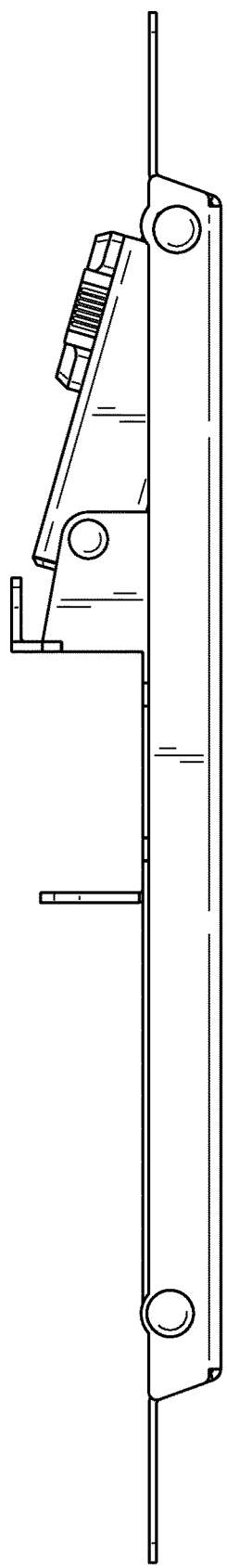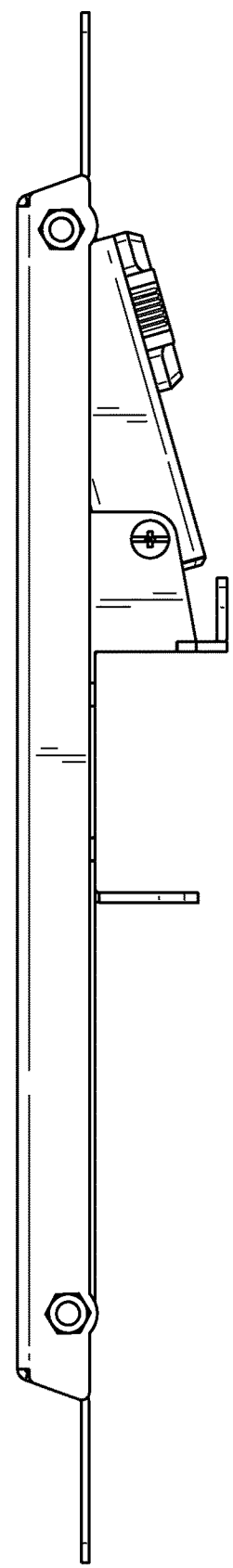
*FIG. 20*  *FIG. 21*

TELEVISION SUPPORT TILT MECHANISM

CROSS-REFERENCE TO RELATED PATENT APPLICATIONS

This application is a continuation of U.S. application Ser. No. 18/099,731, filed on Jan. 20, 2023, which application is a continuation of U.S. application Ser. No. 17/838,431, filed on Jun. 13, 2022, which application is a continuation of U.S. application Ser. No. 16/984,404, filed on Aug. 4, 2020, which application is a continuation of and claims priority to U.S. Design patent applications Nos. 29/740,167 and 29/740,169, both filed on Jul. 1, 2020, each of which are hereby incorporated by reference in their entirety.

BACKGROUND

Tilting television wall mounts are generally known in the art. For example, US Publication No. 2008/0283694 (which publication is incorporated herein by reference in its entirety) describes a display wall mount with a wall bracket configured to couple to a wall and having a first wall bracket edge, a display bracket configured to couple to the display and having a first display bracket edge, and a curvilinear bar moveably coupled between the first wall bracket edge and the first display bracket edge, where the display bracket is moveably coupled to the wall bracket.

SUMMARY

An example electronic device mounting apparatus includes a head portion configured for attachment to an electronic device, an undercarriage portion configured for attachment to a wall, and a telescopic portion comprising a first member, a second member, and a locking mechanism. A first end of the head portion is rotatably attached to a first end of the undercarriage portion and a second end of the undercarriage portion is rotatably attached to a first end of the telescopic portion on the first member. A second end of the head portion is rotatably attached to a second end of the telescopic portion on the second member. The first and second members of the telescopic portion are configured to telescopically slide with respect to one another. The locking mechanism is configured to lock the first and second members of the telescopic portion into a plurality of different positions with respect to one another. The head portion and the undercarriage portion are configured to form different angles based on which of the plurality of different positions the telescopic portion is locked into.

An example apparatus includes a head portion, an undercarriage portion, and a telescopic portion configured to adjustably move into a plurality of different lengths. A first end of the head portion is rotatably attached to a first end of the undercarriage portion and a second end of the undercarriage portion is rotatably attached to a first end of the telescopic portion. A second end of the head portion is rotatably attached to a second end of the telescopic portion. In a first position, the telescopic portion has a first length of the plurality of different lengths and the head portion and the undercarriage portion form a first angle. In a second position, the telescopic portion has a second length of the plurality of different lengths and the head portion and the undercarriage portion form a second angle different from the first angle.

An example electronic device mounting system includes a head portion attached to an electronic device, an undercarriage portion mounted to a wall, and a telescopic portion configured to adjustably move the head portion and the electronic device into a plurality of different positions. The plurality of different positions comprises at least a first position and a second position. Movement of the telescopic portion adjusts an angle of a display of the electronic device with respect to the wall. The telescopic portion includes a locking mechanism configured to permit movement of the head portion from the first position to the second position without manual actuation of the locking mechanism. The locking mechanism is further configured to permit movement of the telescopic portion from the second position only upon manual actuation of the locking mechanism.

A better understanding of the objects, advantages, features, properties and relationships of the hereinafter disclosed television support tilt mechanisms will be obtained from the following detailed description and accompanying drawings which set forth illustrative examples and which are indicative of the various ways in which the principles of the described television support tilt mechanisms may be employed.

BRIEF DESCRIPTION OF THE DRAWINGS

The features, advantages, and objects of the subject disclosure will become more apparent from the detailed description as set forth below, when taken in conjunction with the drawings in which like referenced characters identify correspondingly throughout, and wherein:

FIG. 8 is a top, front perspective view of a telescopic portion thereof in a retracted position;

FIG. 9 is a top, front perspective view of the telescopic portion thereof in an extended position;

FIG. 18 is rear side elevational view thereof;

FIG. 19 is a front side elevational view thereof;

FIG. 20 is a left side elevational view thereof;

FIG. 21 is a right side elevational view thereof;

DETAILED DESCRIPTION

Figure 1:
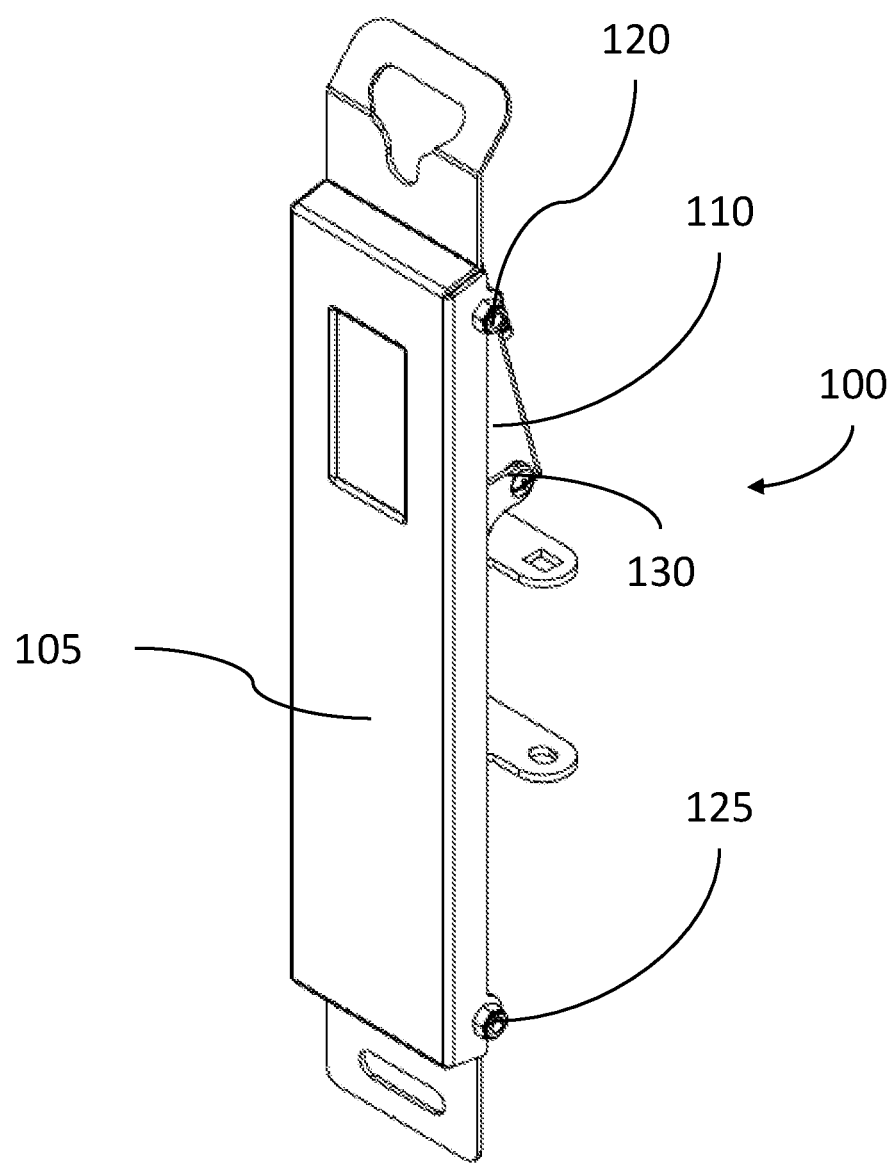
FIG. 1 is a top, front perspective view of a first embodiment of a television support tilt mechanism.
Figure 2:
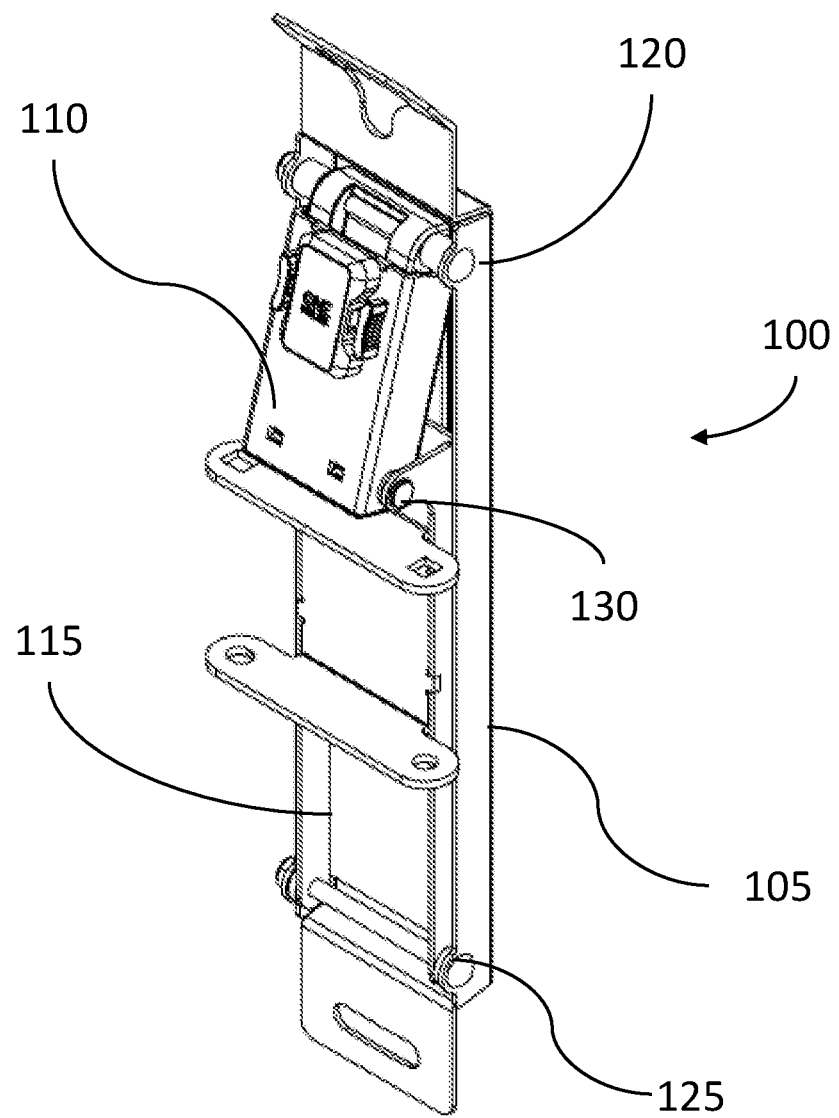
FIG. 2 is a top, rear perspective view thereof.
Figure 3:
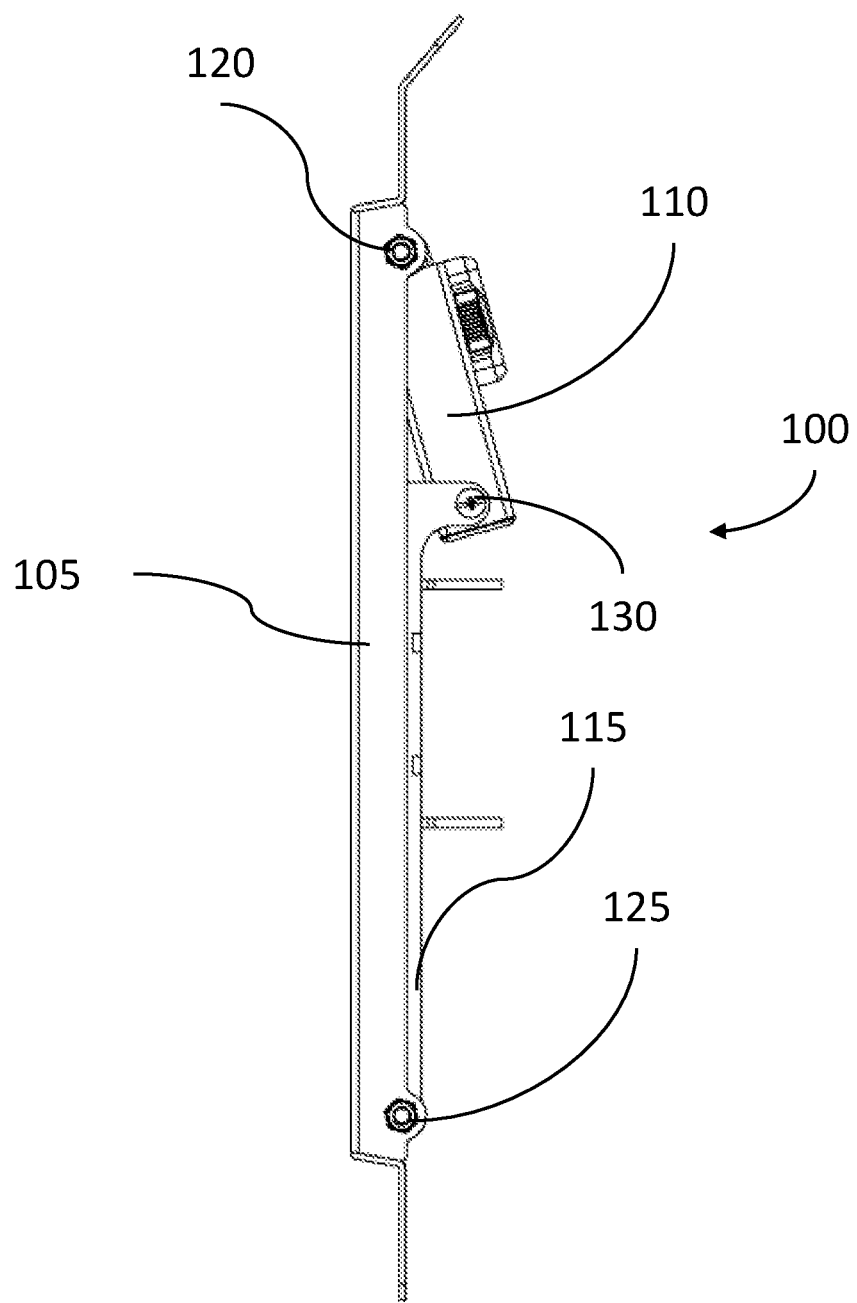
FIG. 3 is a right side elevational view thereof.
Figure 4:
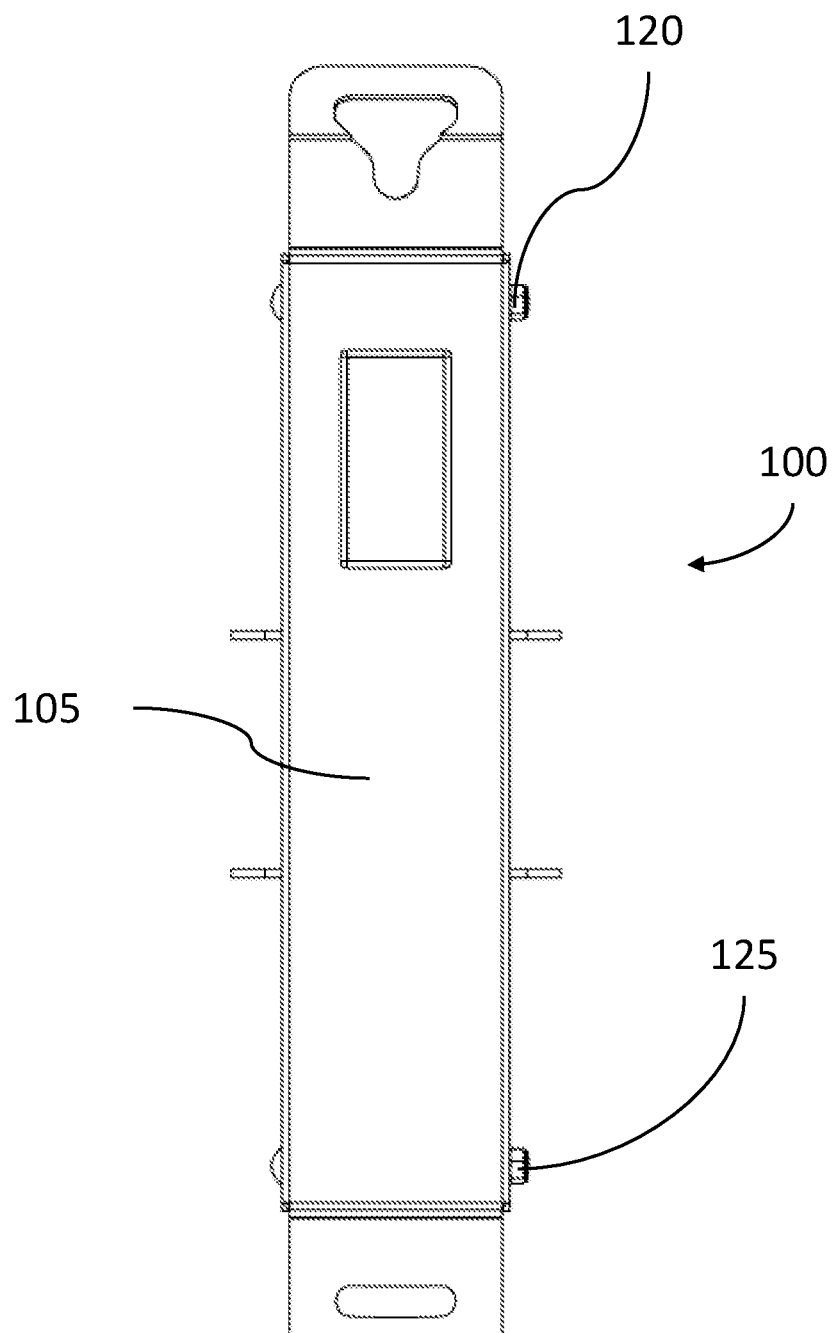
FIG. 4 is a front side elevational view thereof.
Figure 5:
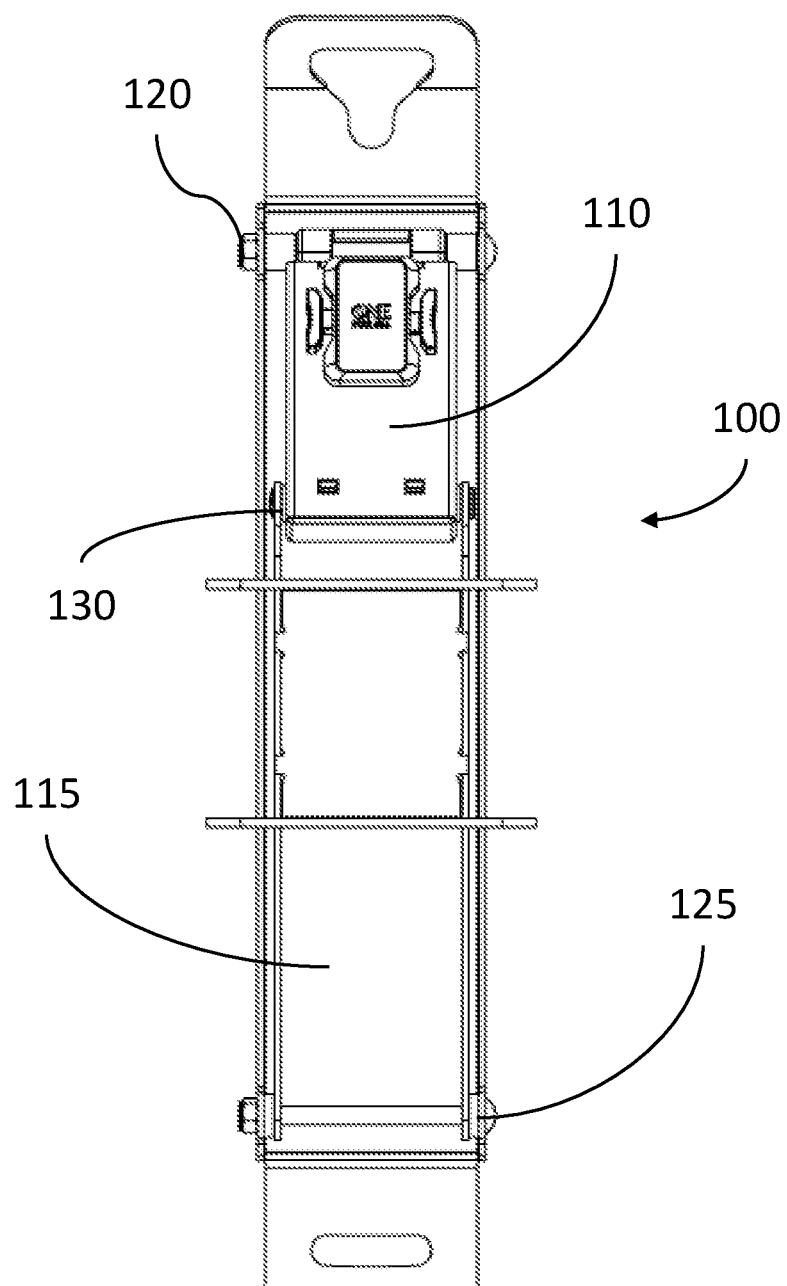
FIG. 5 is a back side elevational view thereof.
Figure 6:
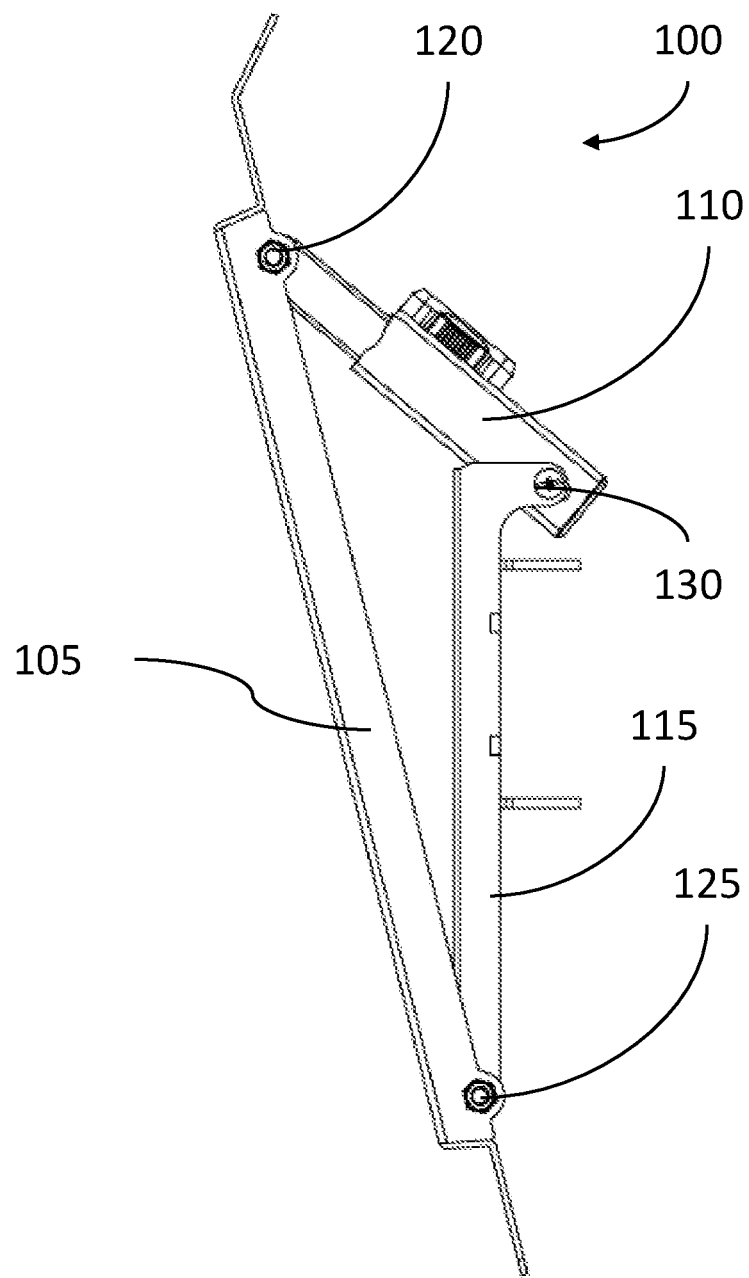
FIG. 6 is a right side elevational view thereof in a tilted position.
Figure 7:
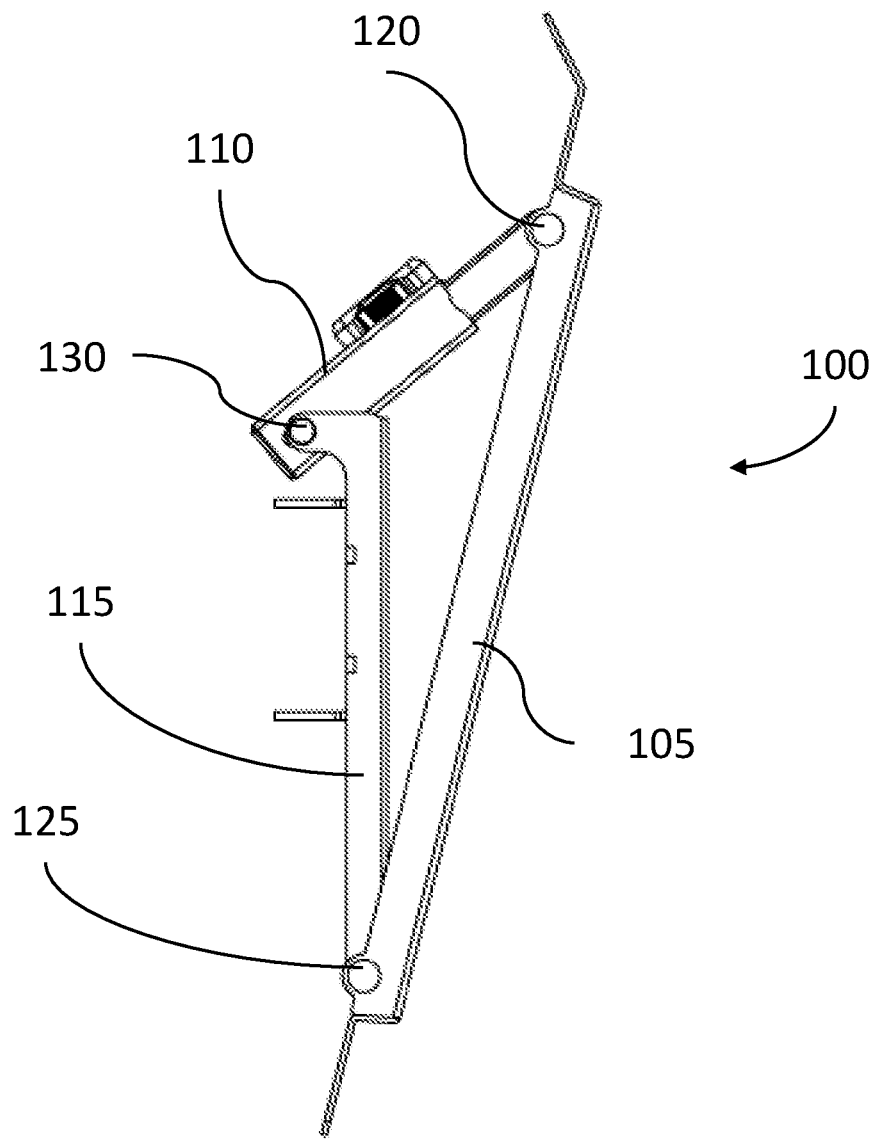
FIG. 7 is a left side elevational view thereof in a tilted position.
Figure 10:
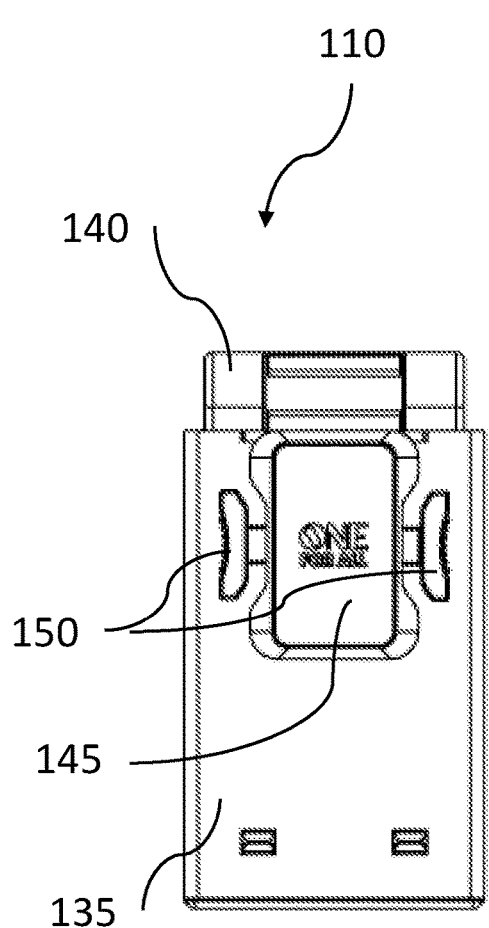
FIG. 10 is a front side elevational view of the telescopic portion thereof in the retracted position.

Disclosed herein are various embodiments of a tilting support mechanism for electronic devices, such as a television, computer monitor, etc. Because electronic devices such as televisions, computer monitors, etc. typically have displays, it is desirable for any mounting hardware or supports for those electronic devices to be adjustable. In this way, a user may adjust the positioning of the electronic device without removing the electronic device from its mounting hardware and/or supports.

In particular, disclosed herein are embodiments for a support mechanism for electronic devices that enables easy tilting of an electronic device that is mounted to a wall (either directly or via separate wall mount hardware) or mounted to some other structure than a wall. Advantageously, the embodiments disclosed herein provide for the electronic device to be tilted to multiple different tilt angles, while also providing a locking mechanism that securely locks the electronic device into each one of those multiple different tilt angles. Additionally, as described further herein, the locking mechanism includes a ratcheting mechanism that allows for manual adjustment of the tilt of the electronic device in a first direction (e.g., reducing the tilt angle of the electronic device) without specifically actuating the locking mechanism, while permitting adjustment of the tilt of the electronic device in a second direction (e.g., increasing the tilt angle of the electronic device) by actuating (e.g., unlocking) the locking mechanism. Such features provide for an improved tilting mechanism that is simple for a user to adjust the tilt of an electronic device, while still providing secure mounting for the electronic device to protect it from unwanted movement, damage, etc.

FIGS. 1-7 illustrate a first embodiment of a television support tilt mechanism 100. While various embodiments disclosed herein refer to a television, the support tilt mechanisms disclosed herein may be used with any object, including other electronic devices, or other objects that are not electronic devices at all.

The television support tilt mechanism 100 includes three major components, a head portion 105, an undercarriage portion 115, and a telescopic portion 110. The head portion 105 may be configured for attachment to an electronic device such as a television. The head portion 105 includes various openings and/or features that provide for the electronic device to be rigidly secured to the head portion 105. As further disclosed herein, the head portion 105, with the electronic device attached thereto, may be adjusted to different angles so that a display of the electronic device attached thereto may also be oriented at different angles.

The undercarriage portion 115 is configured for rigid attachment to a wall or other structure, either directly or indirectly. For example, the undercarriage portion 115 may be directly attached to a wall or other structure, or may be rigidly attached to some other intermediate support structure that is attached to the wall or other structure. For example, in some embodiments, a wall bracket (not shown) may be attached to a wall or other structure, and the undercarriage portion 115 may be rigidly attached to the wall bracket.

The telescopic portion 110 of the support tilt mechanism 100 is shown in FIGS. 1-3 and 5-7, but is described in further detail with respect to FIGS. 8-15. The telescopic portion 110 includes a first member 135 and a second member 140 that can move or slide telescopically with respect to one another. In other words, the first member 135 may slide with respect to the second member 140. For example, FIGS. 1-5, 8, 10, 12, and 14 show the telescopic portion 110 in a fully retracted position, where the first member 135 and the second member 140 overlap to a greatest extent. As shown in FIGS. 1-5, this represents a tilt position where the undercarriage portion 115 and the head portion 105 are generally parallel (e.g., form an angle of zero degrees). As such, an electronic device rigidly attached to the head potion 105 may also therefore have a display surface that is generally parallel to the undercarriage portion 115, the head portion 105, and/or a wall to which the tilt support mechanism 100 is directly or indirectly attached.

In FIGS. 6, 7, 9, 11, 13, and 15, the first member 135 and the second member 140 have telescopically moved with respect to one another (e.g., have been slid) as compared to FIGS. 1-5, 8, 10, 12, and 14 to a different, extended position. In such an extended position, the head portion 105 and the undercarriage portion 115 form an angle that is greater than zero degrees. As such, a surface of an electronic device mounted to the head portion 105 may also therefore form an angle with the undercarriage portion 115 and/or a wall to which the undercarriage portion 115 is directly or indirectly attached that is greater than zero degrees. In the extended position, such a surface of an electronic device may be tilted downward relative to a floor so that it may be more easily viewed. As such, the bottom of the tilt support mechanism 100 may be generally oriented on the end where the undercarriage portion 115 is connected to the head portion 105, while the top of the tilt support mechanism 100 is generally oriented on the end where the head portion 105 is connected to the telescopic portion 110.

While only two different positions of the tilt support mechanism 100 are demonstrated in FIGS. 1-15, the tilt support mechanism 100 may be adjusted to additional positions between a fully retracted and fully extended position (e.g., additional partially extended positions). Each position to which the tilt support mechanism 100 may be adjusted may form different angles between the undercarriage portion 115 and the head portion 105 (which may in turn cause a similar or same angle to be formed between a surface of an electronic device and the undercarriage portion 115 and/or a wall to which it is connected). For example, angles from anywhere including and between zero (0) to thirty (30) degrees may be accomplished using the embodiments described herein. As specific examples, the tilt support mechanism 100 may be locked into varying positions with angles such as 0 degrees, 2.5 degrees, 5 degrees, 7.5 degrees, 10 degrees, 12.5 degrees, 15 degrees, 17.5 degrees, 20 degrees, 22.5 degrees, 25 degrees, 27.5 degrees, and/or 30 degrees.

A first end of the head portion 105 is rotatably attached to a first end of the undercarriage portion 115 at a hinge 125. The hinge 125 acts as a pivot and has an axis about which the head portion 105 and the undercarriage portion 115 may rotate with respect to one another while remaining attached.

A second end of the undercarriage portion 115 is rotatably attached to a first end of the telescopic portion 110 at a hinge 130. The hinge 130 acts as a pivot and has an axis about which the undercarriage portion 115 and the telescopic portion 110 may rotate with respect to one another while remaining attached. The first end of the telescopic portion 110 at which the undercarriage portion 115 is attached is located on the first member 135 of the telescopic portion 110.

A second end of the head portion 105 is rotatably attached to a second end of the telescopic portion 110 at a hinge 120. The hinge 120 acts as a pivot and has an axis about which the head portion 105 and the telescopic portion 110 may rotate with respect to one another while remaining attached. The second end of the telescopic portion at which the head portion 105 is attached is located on the second member 140 of the telescopic portion 110.

Because the head portion 105, the telescopic portion 110, and the undercarriage portion 115 are all rotatably attached to one another, a length of the telescopic portion 110 may be adjusted to form a triangle-shaped structure with different angles. For example, a triangle shape generally formed by the head portion 105, the telescopic portion 110, and the undercarriage portion 115 is visible in FIGS. 6 and 7.

The head portion 105 and the undercarriage portion 115 are further shaped such that, in a completely retracted position (e.g., as shown in FIGS. 1-5), the head portion and the undercarriage portion 115 may overlap to achieve a zero-degree angle between the two. In particular, the head portion 105 may have a U-shaped cross-section defining a main surface, two side surfaces, and a space between the two side surfaces. As shown in FIGS. 1-3, 6, and 7, the hinges 120 and 125 may be attached to the head portion 105 at the side surfaces. In this way, part of the undercarriage portion 115 and/or the telescopic portion 110 may move into the space formed between the two side surfaces of the head portion 105. As such, a width of the undercarriage portion 115 may be less than the width of the space formed between the two side surfaces of the head portion 105. Thus, the head portion 105 and the undercarriage portion 115 may overlap to form a zero-degree angle or other angles. Similarly, the telescopic portion 110 may also partially be in the space formed between the two side surfaces of the head portion 105.

The telescopic portion 110 is shown in greater detail in FIGS. 8-15. In particular, the telescopic portion 110 includes a comprising a first member 135, a second member 150, and a locking mechanism. The locking mechanism is configured to lock the first and second members 135, 140 of the telescopic portion 110 into a plurality of different positions with respect to one another, so that the telescopic portion 110 may have different effective lengths to cause the head portion 105 to tile an electronic device mounted thereon into different position as disclosed herein. In other words, in telescopically sliding the first member 135 with respect to the second member 140, the head portion 105 and the undercarriage portion 115 may form different angles based on which of a plurality of different positions the telescopic portion 110 is locked into.

The locking mechanism of the telescopic portion 110 includes a slider 145 on one of the first or second members (e.g., on the first member 135 in FIGS. 8-15) and locking notches, such as a notch 160, on the other of the first or second members (e.g., on the second member 140 in FIGS. 8-15). The locking notches, including the notch 160, are located in a groove 155 of the second member 140. A portion (not shown) of the slider 145 is configured to move or slide within the groove 155. The portion of the slider 145 in the groove 155 may lock into place in one of the notches as disclosed herein.

The slider 145 comprises an unlocking key 150. The notches prevent movement of the slider 145 in a first direction without actuation of the unlocking key 150 of the slider 145 while permitting movement of the slider 145 in a second direction opposite the first direction without actuation of the unlocking key 150. In the embodiment of FIGS. 8-15, the unlocking key 150 includes two buttons that, when actuated by pressing the buttons together causes the portion of the slider 145 in the groove 155 to compress. The unlocking key 150 is specifically configured to be actuated by compression on two opposing sides of the unlocking key 150. When the portion of the slider 145 in the groove 155 is compressed upon actuation of the unlocking key 150, the notches of the second member 140 no longer interfere with the portion of the slider 145 in the groove 155. Thus, when the unlocking key 150 is actuated, the slider 145 may be moved between positions associated with different notches to change the effective length of the telescopic portion 110 and therefore the tile of an electronic device. The unlocking key 150 may also have a spring or other force that keeps the unlocking key 150 in a normally non-compressed position, which in turn also keeps the portion of the slider 145 in the groove 155 in a wider position to fill the notches in the groove. This keeps the slider 145 locked into a discrete position when it is not otherwise being adjusted by a user.

Figure 11:
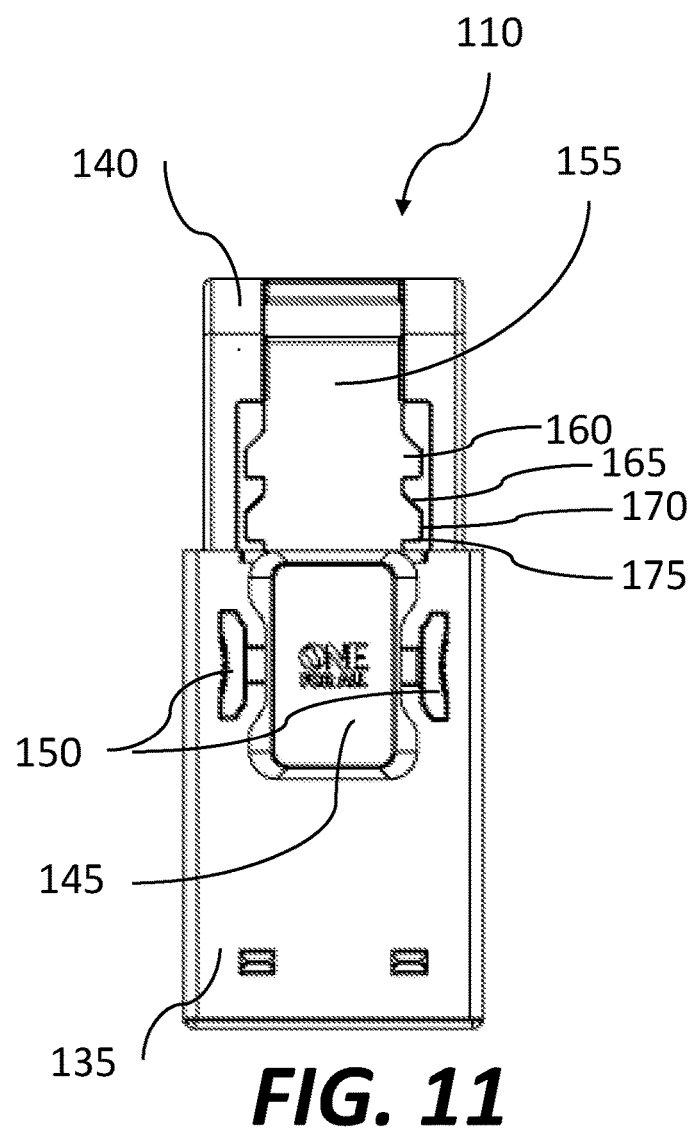
FIG. 11 is a front side elevational view of the telescopic portion thereof in the extended position.
Figures 12, 13:
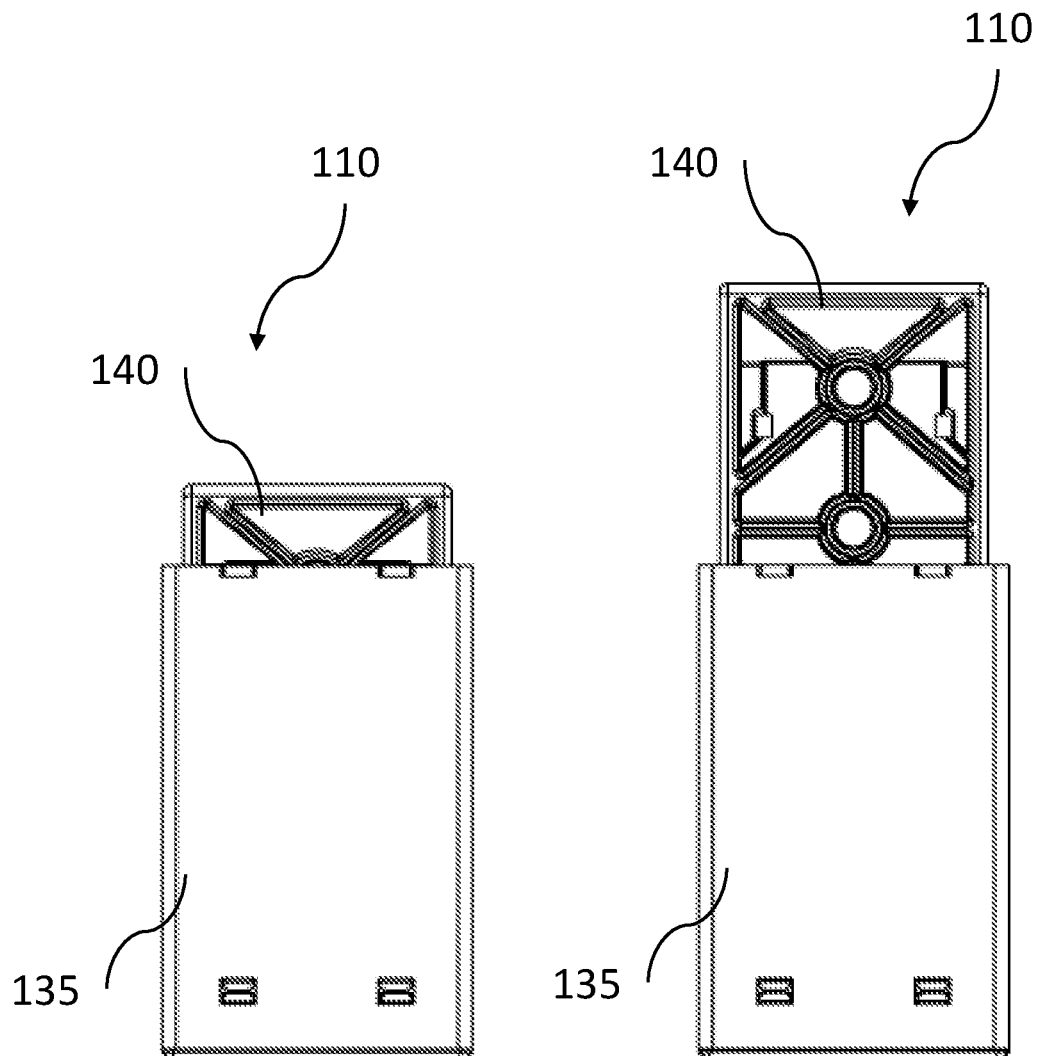
FIG. 12 is a rear side elevational view of the telescopic portion thereof in the retracted position.
FIG. 13 is a rear side elevational view of the telescopic portion thereof in the extended position.
Figure 14:
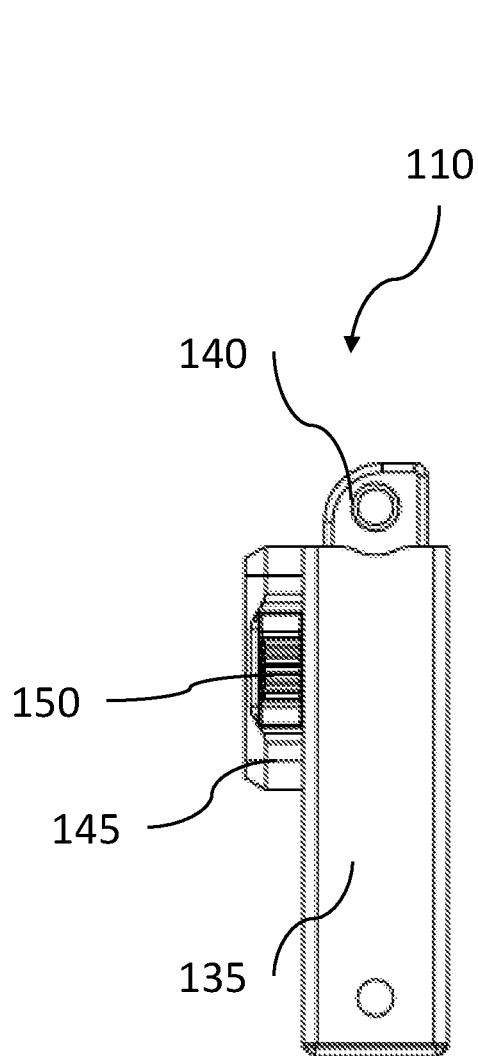
FIG. 14 is a right side elevational view of the telescopic portion thereof in the retracted position.
Figure 15:
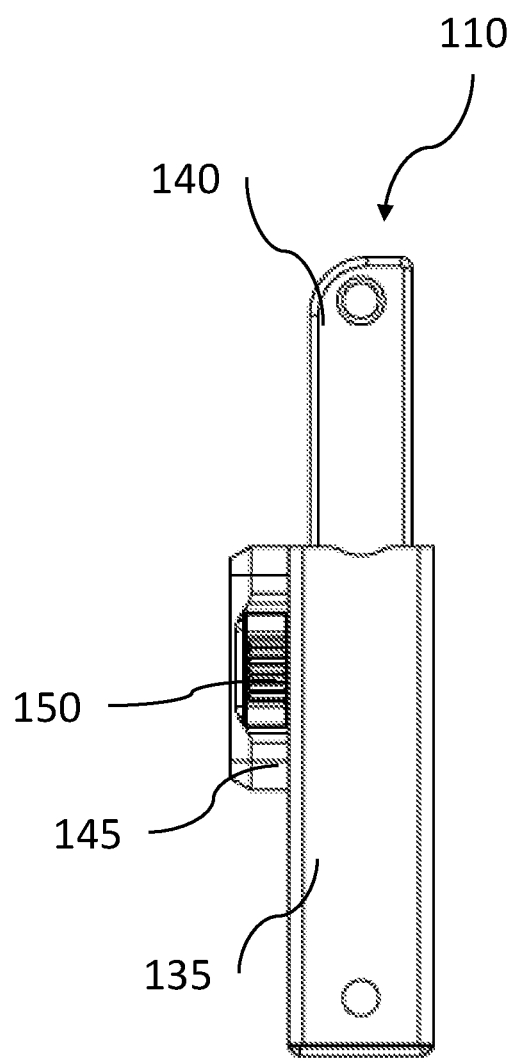
FIG. 15 is a right side elevational view of the telescopic portion thereof in the extended position.
Figure 16:
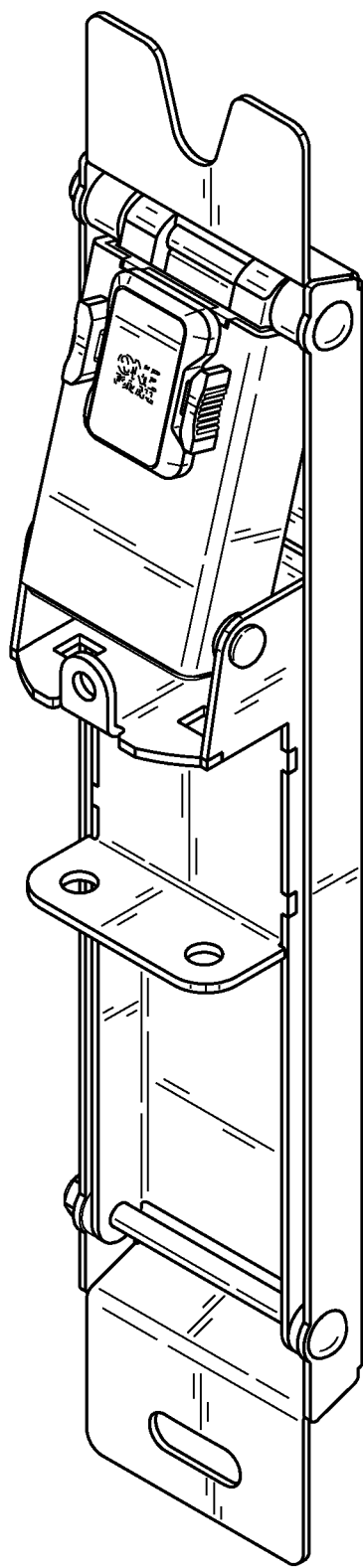
FIG. 16 is a top, rear perspective view of a second embodiment of a television support tilt mechanism.
Figure 17:
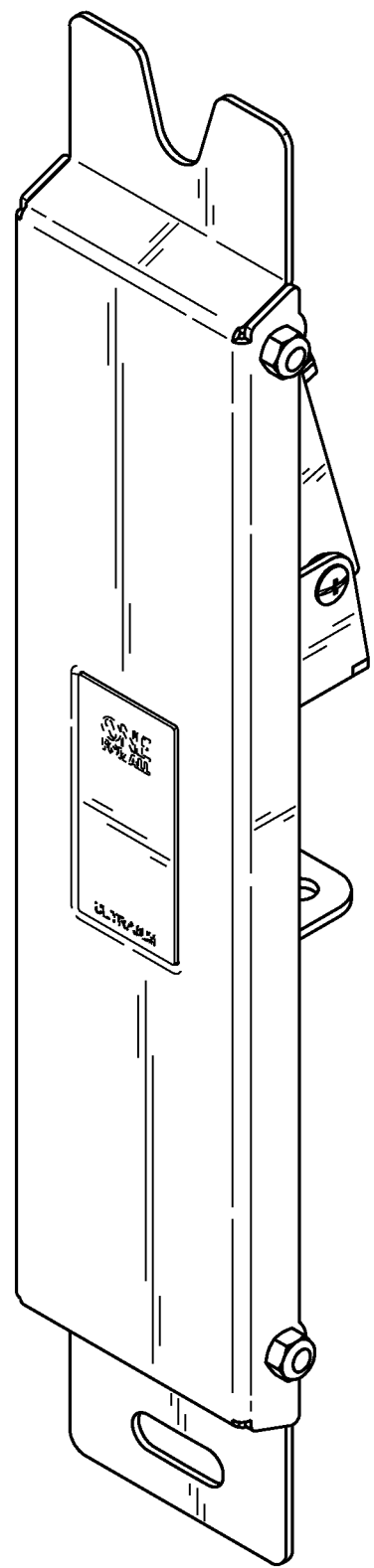
FIG. 17 is a top, front perspective view thereof.
Figure 22:
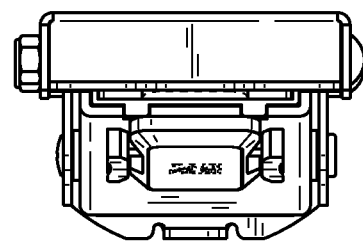
FIG. 22 is a top plan view thereof.
Figure 23:
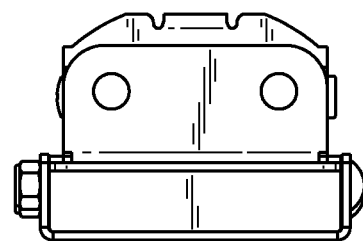
FIG. 23 is a bottom plan view thereof.
Figure 24:
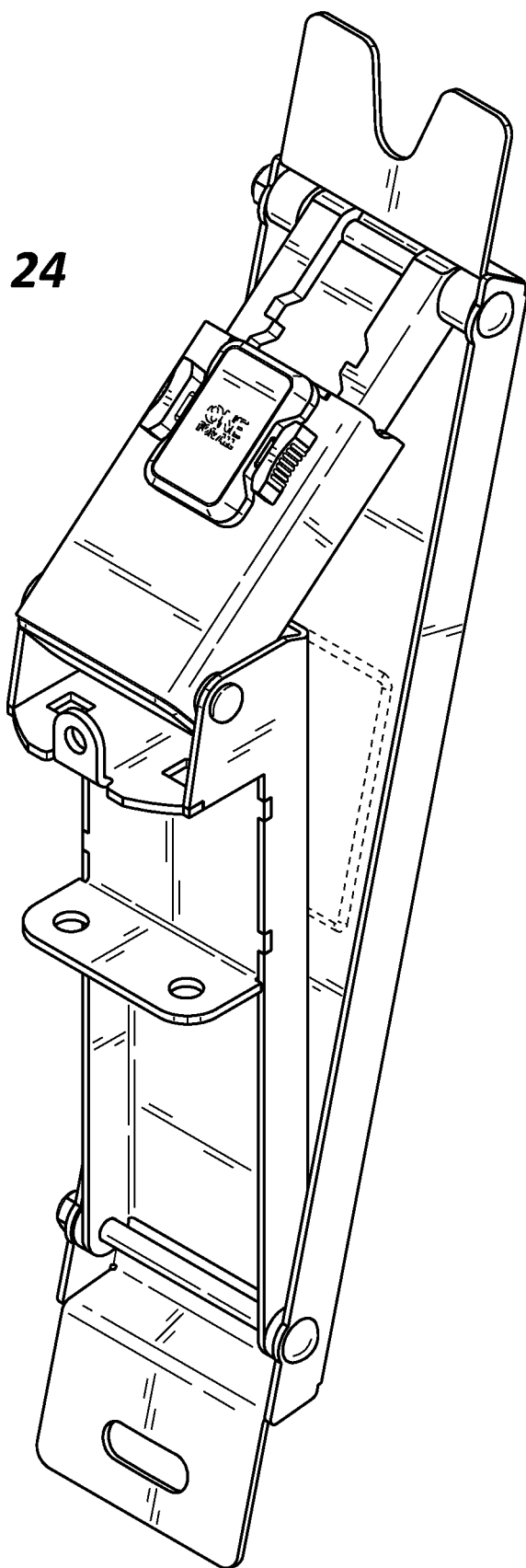
FIG. 24 is a top, front perspective view thereof in a tilted position.
Figure 25:
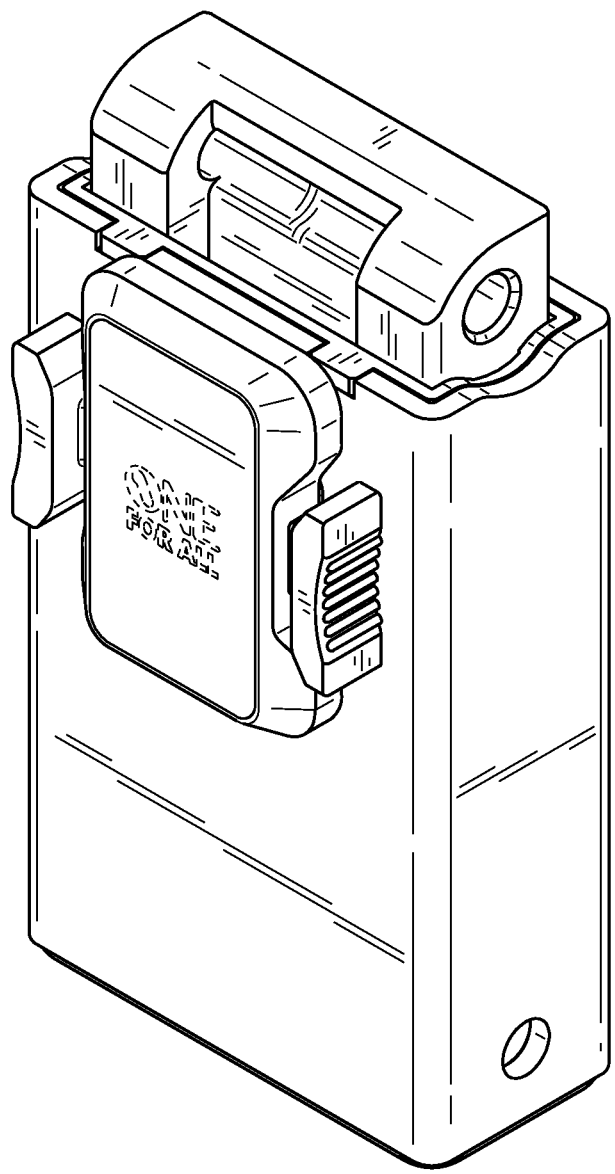
FIG. 25 is a top, front perspective view of a telescopic portion thereof in a retracted position.
Figure 26:
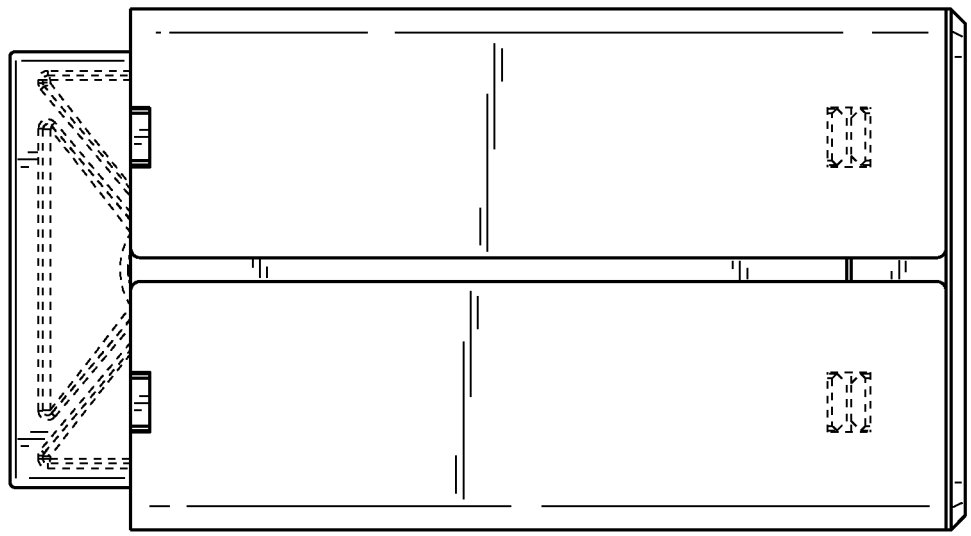
FIG. 26 is rear side elevational view of the telescopic portion thereof.
Figure 27:
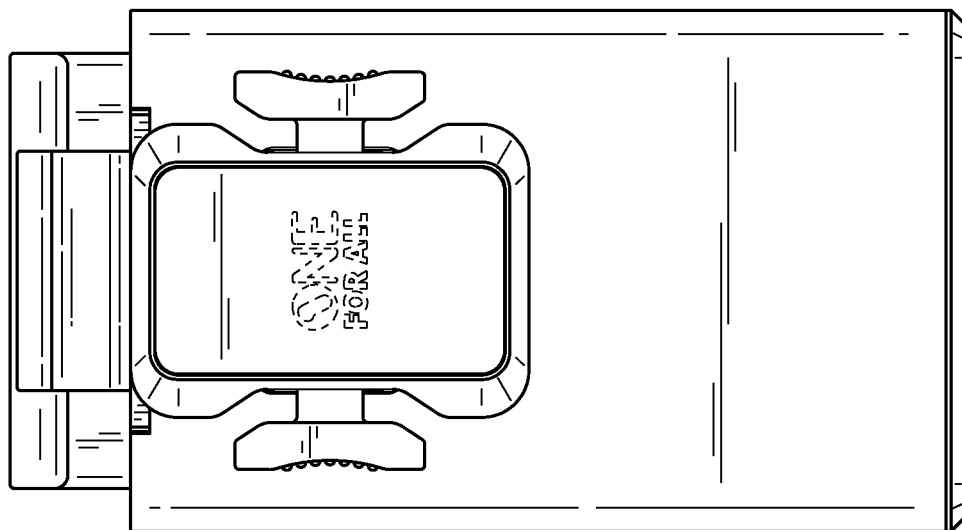
FIG. 27 is a front side elevational view of the telescopic portion thereof.
Figure 28:
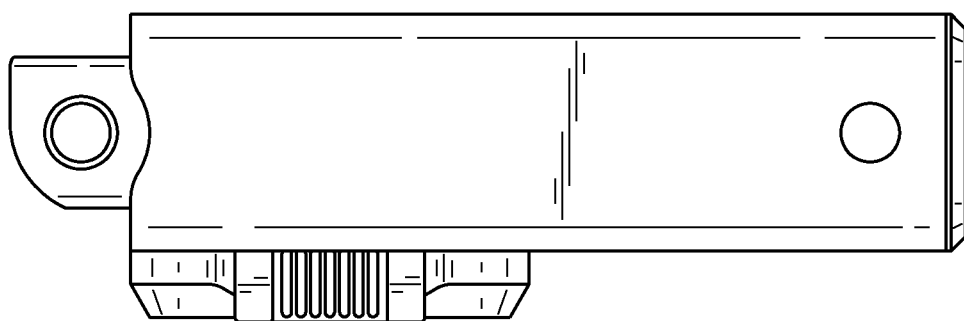
FIG. 28 is a right side elevational view of the telescopic portion thereof.
Figure 29:
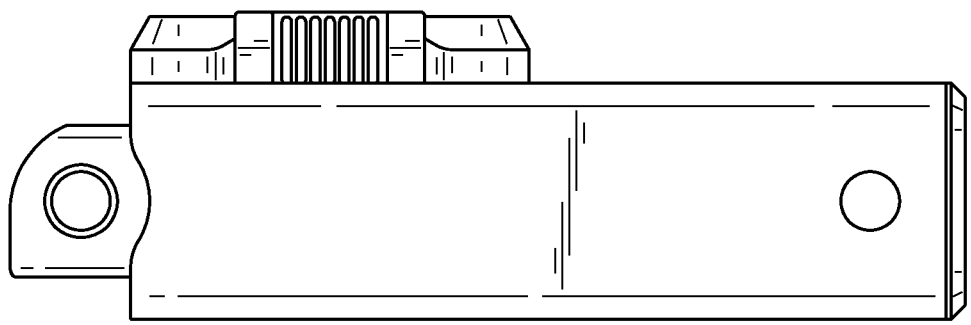
FIG. 29 is a left side elevational view of the telescopic portion thereof.
Figure 30:
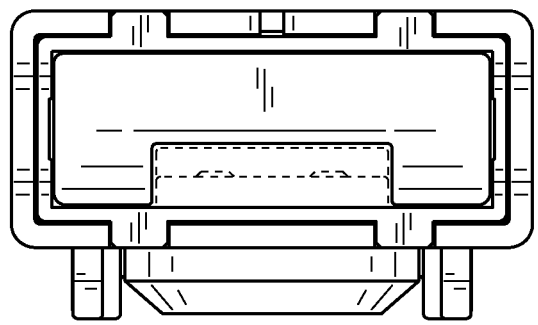
FIG. 30 is a top plan view of the telescopic portion thereof.
Figure 31:
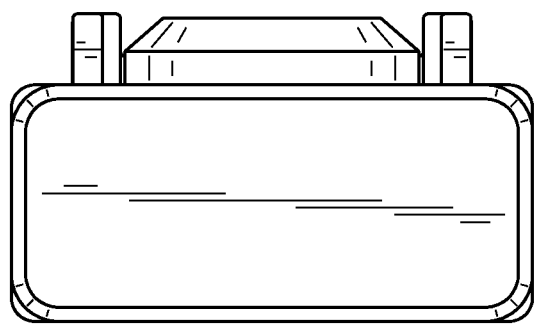
FIG. 31 is a bottom plan view of the telescopic portion thereof.
Figure 32:
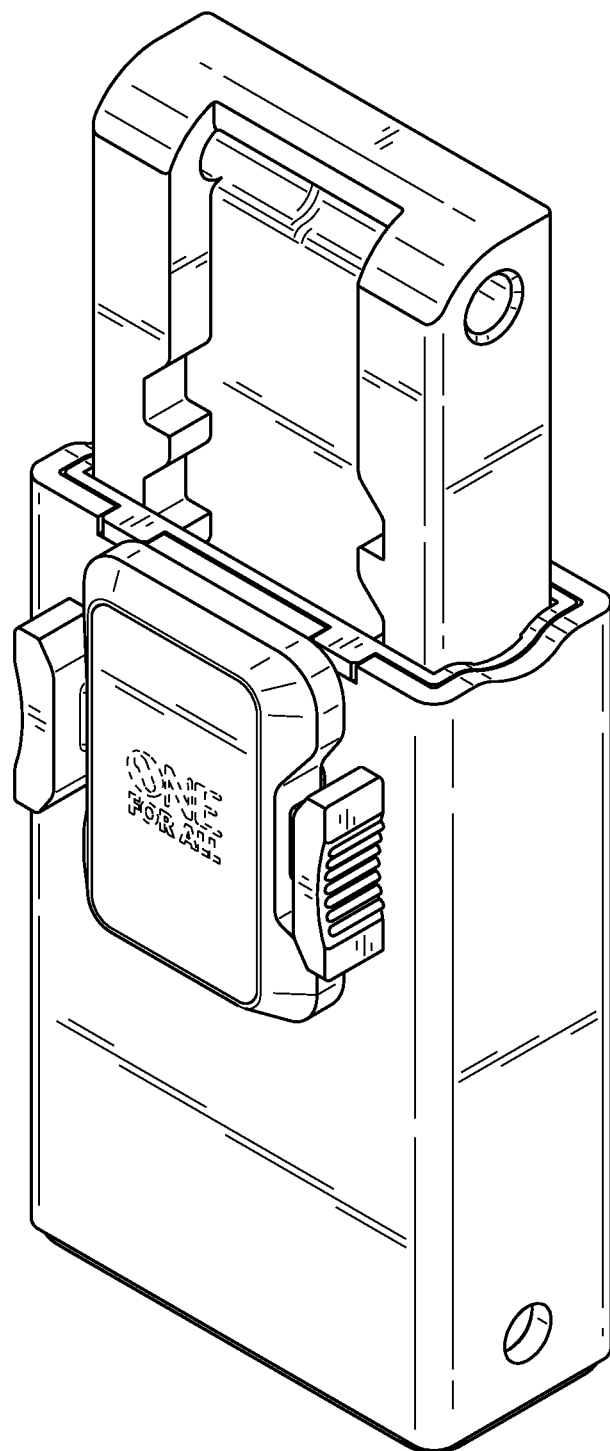
FIG. 32 is a top, front perspective view of the telescopic portion thereof in an extended position.

Each of the notches, including the notch 160, includes three surfaces shown in FIG. 11. A surface 170 and a surface 175 are generally perpendicular or normal to one another, while a surface 165 is angled with respect to the other surfaces at a non-right angle. In particular, the surface 165 and the surface 170 form an angle between ninety (90) degrees and one hundred eighty (180) degrees. This provides a ratcheting mechanism, such that the portion of the slider 145 that is in the groove 155 can slide over the surface 165 into the notch 160 without actuation of the unlocking key 150 (e.g., without compressing the buttons of the unlocking key 150 together). In contrast, because of the angle between the surfaces 170 and 175, the portion of the slider 145 in the groove 155 could not move in an opposite direction unless the unlocking key 150 is actuated/compressed to narrow the width of the portion of the slider 145 in the groove 155 to prevent interference between the slider 145 and the surface 175. Stated another way, the slider 145 may be automatically actuated to move in a first direction (e.g., sliding over the surface 165), but the slider 145 must be manually actuated by a user (e.g., compressing the unlocking mechanism 150) to move in a second direction.

In other words, the ratcheting mechanism of the telescopic portion 110 provides for the slider 145 to move between locking notches in a first direction without actuation of the unlocking key, and provides for the slider 145 to move between the locking notches in a second direction with actuation of the unlocking key. In the example of FIGS. 1-15, movement of the slider 145 in the first direction that does not require actuation of the unlocking key 150 causes a reduction of an angle between the head portion 105 and the undercarriage portion 115, as well as reduction of an angle between the undercarriage portion 115 and any electronic device mounted to the head portion 105. This first direction of movement (e.g., shortening the effective length of the telescopic portion 110) requires a user to push on the head portion 105 or electronic device mounted thereon against the force of gravity. Thus, the telescopic portion 110 will not move in the first direction accidentally. Likewise, the force of gravity acts on the tilt support mechanism 100 in a way that pulls the portion of the slider 145 in the groove 155 against the right-angled surfaces (e.g., the surface 175) of the notches, also further locking the telescopic portion 110 in place. Thus, the telescopic portion 110 may be adjusted by pushing the electronic device toward a wall against the force of gravity to take advantage of the ratcheting mechanism, or may be adjusted with the help of gravity only when the unlocking key 150 is properly actuated.

As shown in FIG. 11, the notches include opposing notches on two sides of the groove 155. The notches on the two opposing sides of the groove 155 in the example of FIG. 11 are also symmetrical with respect to an axis aligned with a movement direction of the slider 145 of the telescopic portion 110. Actuation of the unlocking key 150 therefore causes a portion of the slider 145 in the groove 155 to compress such that the portion of the slider 145 in the groove 155 does not interfere with opposing notches on each side of the groove 155. The surface 170 is also parallel to the movement direction of the slider 145 of the telescopic portion 110.

FIGS. 16-32 show a second embodiment of an electronic device tilt support mechanism that functions similarly to the embodiment shown in and described with respect to FIGS. 1-15.

Accordingly, disclosed herein are various embodiments for a wall mount for a display screen/television (TV) screen that includes a head portion that can be tilted along a horizontal axis relative to an undercarriage portion. The wall mount further includes a telescopic portion where the tilting is controlled by means of a ratcheting mechanism in the telescopic portion. The ratcheting mechanism allows for convenient and safe stepwise tilting from maximum tilt to an upright position. Other tilting mechanisms braked by friction require manual adjusting with tools (e.g., wrench, Allen key, screwdriver) to adjust the tilt friction to the weight of the display screen/TV. In such mechanisms, too low friction leads to unwanted self-tilting, while too high friction means that a lot of manual force is required for tilting from maximum tilt to upright position. Advantageously, the proposed tilting mechanism is independent of the weight of the display screen/TV and inherently safe because it is locked unless and until it is intentionally unlocked.

While various concepts have been described in detail, it will be appreciated by those skilled in the art that various modifications and alternatives to those concepts could be developed in light of the overall teachings of the disclosure. For example, different or similar components to those disclosed herein that achieve the same ends may be used in place of or in combination with any of the components of the examples above. It will also be appreciated that a detailed discussion of the actual implementation of various aspects of the examples described herein (e.g., how to attach a tilt support mechanism to a wall) is not necessary for an enabling understanding of the invention. Rather, the actual implementation of the embodiments disclosed herein would be well within the routine skill of an engineer, given the disclosure herein. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A system comprising:
a television; and
a mounting apparatus comprising a head portion attached to the television, an undercarriage portion, and a telescopic portion, having a locked state and an unlocked state, having a first end connected directly to the head portion and a second end, opposite the first end, connected directly to the undercarriage portion;
wherein the telescopic portion is collapsible in a first direction when the telescopic portion is in the locked state, the telescopic portion is collapsible in the first direction when the telescopic portion is in the unlocked state, the telescopic portion is expandable in a second direction, opposite to the first direction, when the telescopic portion is in the unlocked state, and the telescopic portion is inhibited from being expandable in the second direction when the lock is in the locked state.

2. The system as recited in claim 1, wherein the head portion is hingedly connected to the first end of telescopic portion.

3. The system as recited in claim 1, wherein the second end of the telescopic portion is hingedly connected to the undercarriage portion.

4. The system as recited in claim 2, wherein the telescopic portion comprises a lockable ratcheting mechanism.

5. The system as recited in claim 3, wherein the telescopic portion comprises a lockable ratcheting mechanism.

6. The system as recited in claim 1, wherein the telescopic portion comprises a lockable ratcheting mechanism interposed between a first end portion having the first end directly connected to the head portion and a second end portion, opposite the first end portion, having the second end directly connected to the undercarriage portion.

7. The system as recited in claim 6, wherein the first end portion is hingedly connected to the head portion.

8. The system as recited in claim 7, wherein the second end portion is hingedly connected to the undercarriage portion.

9. The system as recited in claim 6, wherein the first end portion is movable into a one of a plurality of discrete and finite positions defined relative to the second end portion.

10. The system as recited in claim 7, wherein the first end portion is movable into a one of a plurality of discrete and finite positions defined relative to the second end portion.

11. The system as recited in claim 6, wherein the first end portion is movable into a one of a plurality of discrete and finite positions defined relative to the second end portion.

12. The system as recited in claim 1, wherein the telescopic portion is expandable and collapsible amongst a plurality of discrete and finite positions defined within the telescopic portion.

13. The system as recited in claim 12, wherein the telescopic portion comprises a lockable ratcheting mechanism.

* * * * *